US012591155B2

(12) United States Patent
Kim et al.

(10) Patent No.: US 12,591,155 B2
(45) Date of Patent: Mar. 31, 2026

(54) DISPLAY APPARATUS

(71) Applicant: SAMSUNG ELECTRONICS CO., LTD., Suwon-si (KR)

(72) Inventors: Songhyeon Kim, Suwon-si (KR); Jaesic Moon, Suwon-si (KR); Sungdo Jo, Suwon-si (KR); Daegun Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 180 days.

(21) Appl. No.: 17/885,180

(22) Filed: Aug. 10, 2022

(65) Prior Publication Data

US 2023/0144694 A1 May 11, 2023

Related U.S. Application Data

(63) Continuation of application No. PCT/KR2022/011475, filed on Aug. 3, 2022.

(30) Foreign Application Priority Data

Nov. 11, 2021 (KR) ......................... 10-2021-0155089

(51) Int. Cl.
 *G02F 1/1333* (2006.01)
 *F21V 8/00* (2006.01)
(52) U.S. Cl.
 CPC .. *G02F 1/133322* (2021.01); *G02F 1/133314* (2021.01); *G02F 1/133317* (2021.01); *G02B 6/0051* (2013.01); *G02B 6/0068* (2013.01)
(58) Field of Classification Search
 CPC ......... G02F 1/133322; G02F 1/133314; G02F 1/133317; G02F 1/1333; G02F 1/1336;
(Continued)

(56) References Cited

U.S. PATENT DOCUMENTS 10,012,377 B2 7/2018 Coo
10,558,068 B2 2/2020 Ohtsubo
(Continued)

FOREIGN PATENT DOCUMENTS

JP 2004-279864 A 10/2004
JP 2013-130722 A 7/2013
(Continued)

OTHER PUBLICATIONS

International Search Report (PCT/ISA/210), dated Nov. 28, 2022, issued by the International Searching Authority in International Application No. PCT/KR2022/011475.
(Continued)

*Primary Examiner* — Jennifer D. Carruth
*Assistant Examiner* — Agnes Dobrowolski
(74) *Attorney, Agent, or Firm* — Sughrue Mion, PLLC

(57) ABSTRACT

Provided is a display apparatus having a structure of fixing an optical sheet to allow the optical sheet to expand uniformly even when a display is rotated. The display apparatus includes a liquid crystal panel; a backlight unit arranged to supply light to the liquid crystal panel; an optical sheet provided between the liquid crystal panel and the backlight unit and having a hole formed therein; and a sheet fixer configured to fix the optical sheet, wherein the sheet fixer includes: an anti-deviation projection inserted in the hole of the optical sheet to restrict movement of the optical sheet in a first direction, and a supporting projection contacting the optical sheet to restrict movement of the optical sheet in a second direction opposite the first direction.

23 Claims, 22 Drawing Sheets

FORWARD ◄——— ———► BACKWARD

(58) Field of Classification Search
CPC ......... G02F 1/133325; G02F 1/133606; G02B 6/0051; G02B 6/0068; G02B 6/0088
See application file for complete search history.

(56) References Cited

U.S. PATENT DOCUMENTS

| | | | |
|---|---|---|---|
| 11,327,220 B2 | 5/2022 | Kim et al. | |
| 2007/0279728 A1* | 12/2007 | Murakata | G02B 6/0088 359/245 |
| 2009/0033827 A1* | 2/2009 | Chen | G02F 1/1335 362/633 |
| 2010/0079699 A1 | 4/2010 | Cho et al. | |
| 2015/0293290 A1* | 10/2015 | Ogino | H04N 9/315 348/791 |

FOREIGN PATENT DOCUMENTS

| | | |
|---|---|---|
| JP | 2016-105157 A | 6/2016 |
| JP | WO2017/037856 A1 | 3/2017 |
| KR | 10-2016-0001872 A | 1/2016 |
| KR | 10-2017-0033960 A | 3/2017 |
| KR | 10-2017-0079805 A | 7/2017 |
| KR | 10-2017-0114774 A | 10/2017 |
| KR | 10-2020-0001150 A | 1/2020 |
| KR | 10-2021-0022791 A | 3/2021 |

OTHER PUBLICATIONS

Written Opinion (PCT/ Isa/ 237), dated Nov. 28, 2022, issued by the International Searching Authority in International Application No. PCT/KR2022/011475.

Communication issued Sep. 24, 2024 by the European Patent Office in European Patent Application No. 22892977.4.

Communication issued Apr. 18, 2025 by the Korean Intellectual Property Office in Korean Patent Application No. 10-2021-0155089.

Communication dated Oct. 23, 2025, issued by Intellectual Property India in Indian Application No. 202317082670.

Communication dated Dec. 1, 2025, issued by the European Patent Office in European Application No. 22892977.4.

* cited by examiner

FORWARD ◄——— ———► BACKWARD

FORWARD ◄——————► BACKWARD

FORWARD ◄─────  ─────► BACKWARD

FORWARD ◄──────► BACKWARD

FORWARD ←————————→ BACKWARD

FORWARD ←——— ———→ BACKWARD

FORWARD ◄──── ────► BACKWARD

FORWARD ◄─────── ─────► BACKWARD

FORWARD ⟵ ⟶ BACKWARD

FORWARD ◄────  ────► BACKWARD

FORWARD ◄——— ———► BACKWARD

DISPLAY APPARATUS

CROSS-REFERENCE TO RELATED APPLICATION

This application is a bypass continuation of PCT International Application No. PCT/KR2022/011475, which was filed on Aug. 3, 2022, and claims priority to Korean Patent Application No. 10-2021-0155089, filed on Nov. 11, 2021, in the Korean Intellectual Property Office, the disclosure of which is incorporated herein by reference in its entirety.

BACKGROUND

1. Field

The disclosure relates to a display apparatus having an enhanced structure of fixing an optical sheet.

2. Discussion of Related Art

Display apparatuses display obtained or stored electrical information by converting the electrical information to visual information, and are used in various fields such as homes or work places.

The display apparatus may include a display that displays images and a supporting device that supports the display. The supporting device may be formed in various shapes. For example, the supporting device may be coupled onto a wall to support the display in a wall-mounted form or provided in a stand-alone type that stands on the floor to support the display.

The display may be rotationally configured to be selectively positioned horizontally or vertically based on the aspect ratio of an image.

An optical sheet provided in the display may expand due to heat generated when the display is operated. In a case of a structure of fixing the optical sheet without considering rotation of the display, the optical sheet may expand nonuniformly due to rotation of the display, causing creases on a screen of the display.

SUMMARY

Provided is a display apparatus having a structure of fixing an optical sheet to allow the optical sheet to expand uniformly even when a display is rotated.

According to an aspect of the disclosure, a display apparatus includes: a liquid crystal panel; a backlight unit arranged to supply light to the liquid crystal panel; an optical sheet provided between the liquid crystal panel and the backlight unit and having a hole formed therein; and a sheet fixer configured to fix the optical sheet, wherein the sheet fixer includes: an anti-deviation projection inserted in the hole of the optical sheet to restrict movement of the optical sheet in a first direction, and a supporting projection contacting the optical sheet to restrict movement of the optical sheet in a second direction opposite the first direction.

The optical sheet may further include a deformable part configured to come into contact with the supporting projection, and to be structurally deformed by the supporting projection due to expansion of the optical sheet.

The optical sheet may expand in the second direction by structural deformation of the deformable part.

The anti-deviation projection may contact a first end of the hole, and the anti-deviation projection may be spaced apart from a second end of the hole by a gap in the second direction to allow expansion of the optical sheet in the second direction.

The anti-deviation projection may be configured to remain inserted through the hole when the anti-deviation projection moves forward or backward.

The anti-deviation projection may include: a first projection extending through the hole, and an anti-deviation part extending from an end of the first projection in the second direction.

The anti-deviation projection may include: a first projection extending through the hole, and an anti-deviation part extending from an end of the first projection in the first direction, and the anti-deviation part may have a length in the first direction that is longer than a width of the hole in the first direction.

The optical sheet may have a guide hole formed therein, and the guide hole is spaced apart from the hole, and the sheet fixer may further include a guide projection inserted to the guide hole and configured to guide the optical sheet during assembly of the optical sheet.

The guide projection may contact a first end of the guide hole, and the guide projection may be spaced apart from a second end of the guide hole by a gap in the second direction to allow expansion of the optical sheet in the second direction.

The supporting projection may be provided between the anti-deviation projection and the guide projection, spaced apart from the anti-deviation projection in the second direction, and spaced apart from the guide projection in the second direction.

The optical sheet may have a deformable hole formed therein, and the deformable hole is spaced apart from the deformable part between the hole and the guide hole in the first direction, and the deformable hole may be configured to assist structural deformation of the deformable part.

The display apparatus may further include a bottom chassis covering a rear side of the liquid crystal panel, and the sheet fixer may be coupled to the bottom chassis.

The display apparatus may further include: a middle frame provided along edges of the liquid crystal panel and configured to support the liquid crystal panel; and a light guide panel provided between the middle frame and the bottom chassis and configured to diffuse light emitted from the backlight unit, wherein a first edge of the optical sheet is fixed by being pressed by the middle frame and the light guide panel, and wherein one or more remaining edges of the optical sheet are spaced apart from the middle frame by a gap in a forward-backward direction.

The backlight unit may further include: a substrate facing the first edge of the optical sheet pressed by the middle frame and the light guide panel, and a plurality of light sources arranged on the substrate at intervals in a direction in which the substrate extends.

The sheet fixer may be elastically fitted to the bottom chassis without an extra fastening member.

The guide projection may include: a second projection extending forward to penetrate the guide hole, and a bending part bent downward from the second projection.

The supporting projection may include: a third projection extending forward to penetrate the deformable hole, and a first extension extending downward from the third projection.

The supporting projection may further include a second extension extending backward from the first extension.

The deformable hole may be configured to assist structural restoration of the deformable part.

The optical sheet may expand in a direction away from the first edge of the optical sheet and toward the one or more remaining edges of the optical sheet when the optical sheet is in a vertical position, and the optical sheet may expand in a direction toward the first edge of the optical sheet when the optical sheet is in a horizontal position.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
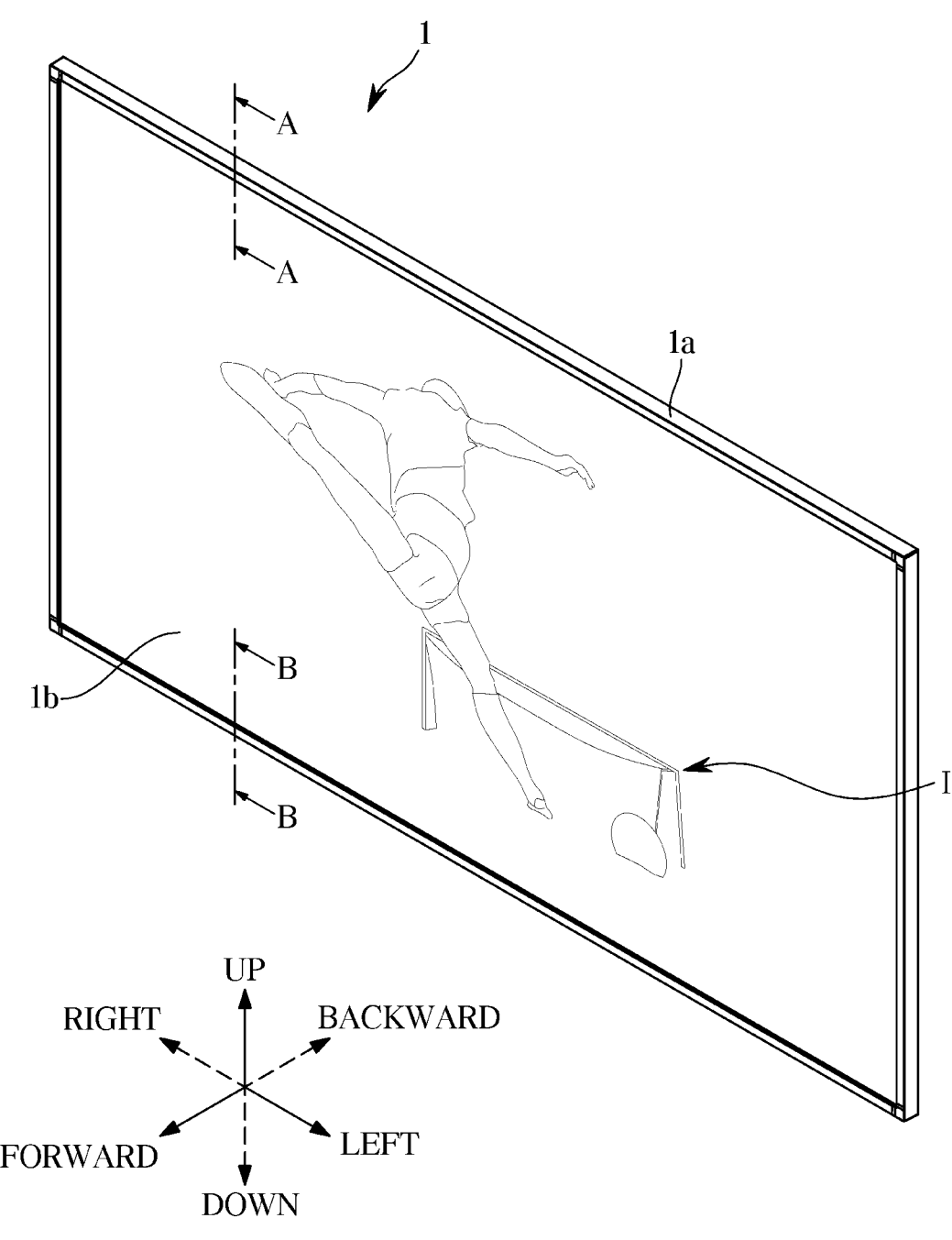
FIG. 1 illustrates an exterior of a display apparatus, according to an embodiment of the disclosure.

Embodiments and features as described and illustrated in the disclosure are merely examples, and there may be various modifications thereto.

Throughout the specification, like reference numerals refer to like parts or components. This specification does not describe all elements of the embodiments of the present disclosure and detailed descriptions on what are well known in the art or redundant descriptions on substantially the same configurations may be omitted.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure. Descriptions shall be understood as to include any and all combinations of one or more of the associated listed items when the items are described by using the conjunctive term "~and/or ~," or the like.

The terms "forward (or front)", "backward (or behind)", "left", and "right" as herein used are defined with respect to the drawings, but the terms may not restrict the shape and position of the respective components.

Reference will now be made in detail to embodiments of the disclosure, which are illustrated in the accompanying drawings, wherein like reference numerals refer to the like elements throughout.

FIG. 1 illustrates an exterior of a display apparatus, according to an embodiment of the disclosure.

Referring to FIG. 1, a display apparatus 1 is a device that is able to process image signals received from the outside and visually present the processed image. In the following description, it is assumed that the display apparatus 1 is a television (TV), but embodiments of the disclosure are not limited thereto. For example, the display apparatus 1 may be implemented in various forms, such as a monitor, a portable multimedia device, a portable communication device, and any device capable of visually presenting images, without being limited thereto.

The display apparatus 1 may be a large format display (LFD) installed outdoors such as on a rooftop of a building or at a bus stop. The display apparatus 1 is not, however, exclusively installed outdoors, but may be installed at any place, even indoors with a lot of foot traffic, e.g., at subway stations, shopping malls, theaters, offices, stores, etc.

The display apparatus 1 may receive contents including video and audio signals from various content sources and output video and audio corresponding to the video and audio signals. For example, the display apparatus 1 may receive content data through a broadcast receiving antenna or a cable, receive content data from a content reproducing device, or receive content data from a content providing server of a content provider.

As shown in FIG. 1, the display apparatus 1 may be oriented in a horizontal direction (i.e., the display apparatus 1 may be in a horizontal position), and may include a main body 1a and a screen 1b for displaying an image I.

The main body 1a forms the exterior of the display apparatus 1, and components for the display apparatus 1 to display the image I or perform many different functions may be included in the main body 1a. Although the main body 1a of FIG. 1 is shaped like a flat panel, the shape of the main body 1a is not limited thereto. For example, the main body 1a may have the form of a curved panel.

Although the main body 1a is shown as having a flat panel shape, the shape of the main body 1a is not limited thereto. The display apparatus 1 may include the main body 1a and a supporting device (not shown) supporting the main body 1a to be rotatable. Alternatively, the main body 1a and the supporting device may be integrally formed. In a case that the main body 1a is rotatable, the screen 1b may be positioned horizontally or vertically based on an aspect ratio of the image I.

The screen 1*b* may be formed on the front side of the main body 1*a* for displaying the image I. For example, the screen 1*b* may display still images or moving images. The screen 1*b* may also display two dimensional (2D) plane images, or three dimensional (3D) stereographic images using parallax of both eyes of the user.

The screen 1*b* may include a non-self-emitting light panel (e.g., a liquid crystal panel) capable of passing or blocking light emitted by a light source, e.g., a backlight unit (BLU).

A plurality of pixels P are formed on the screen 1*b*, and the image I displayed on the screen 1*b* may be formed by rays emitted by the plurality of pixels P. For example, the rays emitted by the plurality of pixels P may be combined like a mosaic into the image I on the screen 1*b*.

The plurality of pixels P may emit light in various colors and brightness. Each of the pixels P may include subpixels PR, PG, and PB to emit different colors of light.

The subpixels PR, PG, and PB may include a red subpixel PR to emit red light, a green subpixel PG to emit green light, and blue subpixel PB to emit blue light. The red light may be defined as having wavelengths in the range of about 620 to about 750 nm, where 1 nm is a billionth of a meter. The green light may have wavelengths in the range of about 495 to 570 nm. The blue light may have wavelengths in the range of about 450 to 495 nm.

By combining the red light of the red subpixel PR, the green light of the green subpixel PG, and the blue light of the blue subpixel PB, each of the pixels P may emit various brightness and colors of light.

Figure 2:
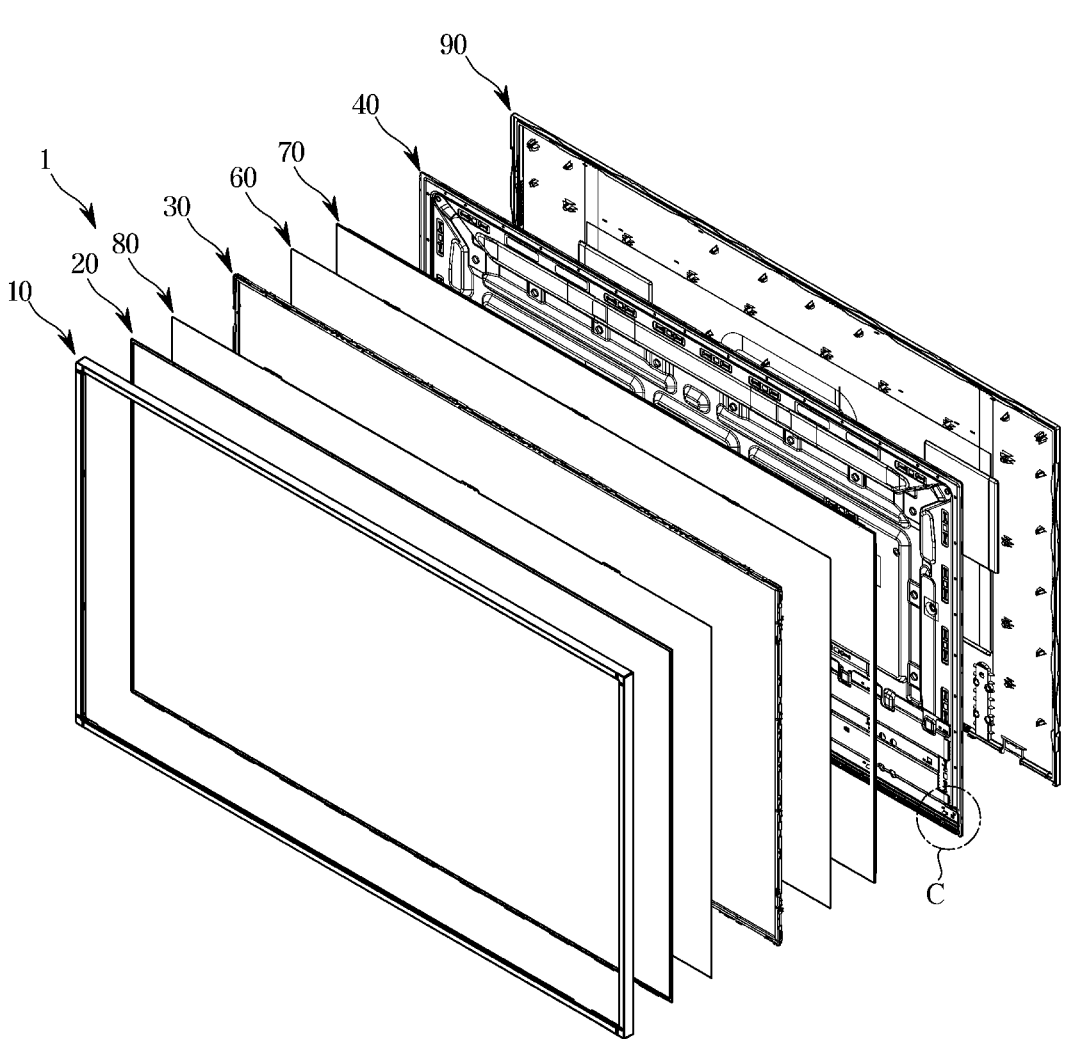
FIG. 2 is an exploded perspective view of a display apparatus, according to an embodiment of the disclosure.
Figure 3:
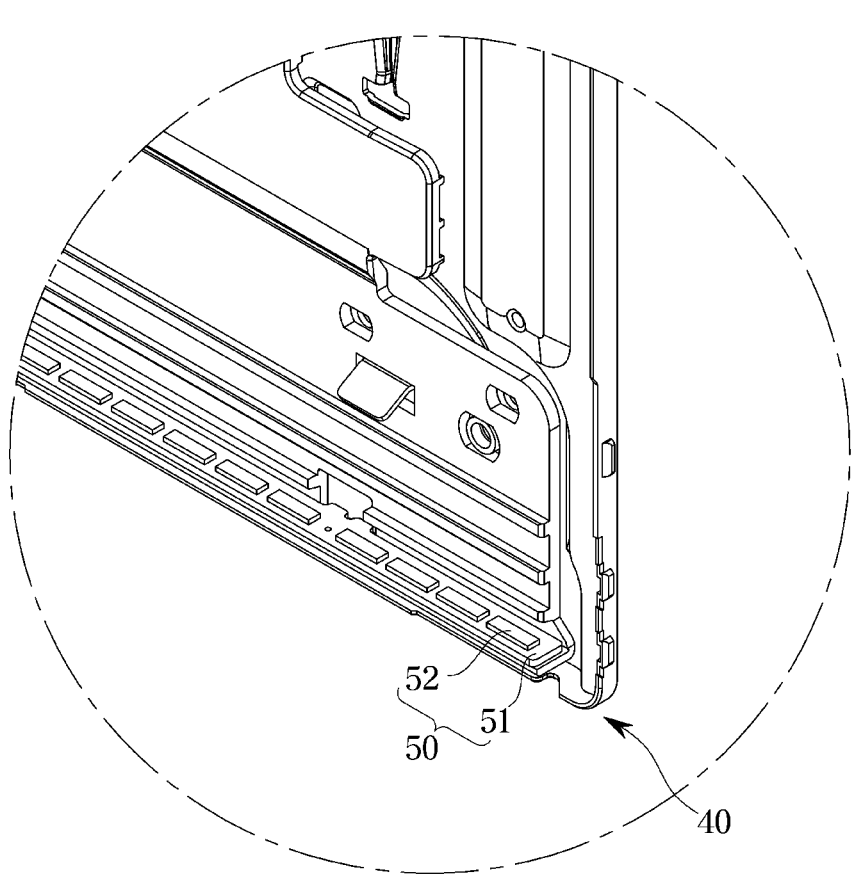
FIG. 3 is an enlarged view of portion C of FIG. 2.

FIG. 2 is an exploded perspective view of a display apparatus, according to an embodiment of the disclosure. FIG. 3 is an enlarged view of portion C of FIG. 2.

Referring to FIG. 2, the display apparatus 1 according to an embodiment of the disclosure may include a BLU 50 provided to emit light, a liquid crystal panel 20 for blocking or passing the light emitted from the BLU 50, a top chassis 10 forming front and side edges of the display apparatus 1, a bottom chassis 40 arranged to cover the rear side of the liquid crystal panel 20, a middle frame 30 arranged to connect between the top chassis 10 and the bottom chassis 40, and a rear cover 90 forming a rear exterior of the display apparatus 1. The rear cover 90 may be coupled onto the rear side of the bottom chassis 40 to form the rear exterior of the display apparatus 1.

The top chassis 10, the bottom chassis 40, the middle frame 30, and the rear cover 90 may form the main body 1*a* of the display apparatus 1.

The display apparatus 1 may further include a light guide panel 70 provided to diffuse the light emitted from the BLU 50, an optical sheet 60 arranged in front of the light guide panel 70, and a sheet fixer 100 (see FIG. 7) provided to fix the optical sheet 60.

In an embodiment of the disclosure, the display apparatus 1 may further include a light diffuser sheet 80 arranged in front of the light guide panel 70 and the optical sheet 60 and behind the liquid crystal panel 20 to diffuse light.

Referring to FIG. 3, the BLU 50 may include a plurality of light emitting diodes (LEDs) 52 emitting monochromatic light (e.g., white light) and a substrate 51 provided for the plurality of LEDs 52 to be mounted thereon. The light guide panel 70, the optical sheet 60, and the light diffuser sheet 80 may refract, reflect and scatter light emitted from the LEDs 52 to convert the emitted light into a uniform surface light.

In an embodiment of the disclosure, the substrate 51 may extend along the lower edge of the bottom chassis 40. The substrate 51 may be placed to be parallel to the ground, and the plurality of LEDs 52 mounted on the substrate 51 may emit light upward. The plurality of LEDs 52 may be arranged at certain intervals in a direction in which the substrate 51 extends.

In an embodiment of the disclosure, the substrate 51 may be arranged on the lower edge of the bottom chassis 40. It is not, however, limited thereto, and the substrate 51 may be arranged on one or both side edges of the bottom chassis 40.

The liquid crystal panel 20 is arranged in front of the light guide panel 70 for blocking or passing the light emitted from the BLU 50 to form the image I.

The front surface of the liquid crystal panel 20 may form the screen 1*b* of the aforementioned display apparatus 1, and the liquid crystal panel 20 may include the plurality of pixels P Each of the pixels P of the liquid crystal panel 20 may block or pass the light from the BLU 50 individually and separately from the remaining pixels P. The light that is passed through by the plurality of pixels P may form the image I displayed on the screen 1*b*.

Figure 4:
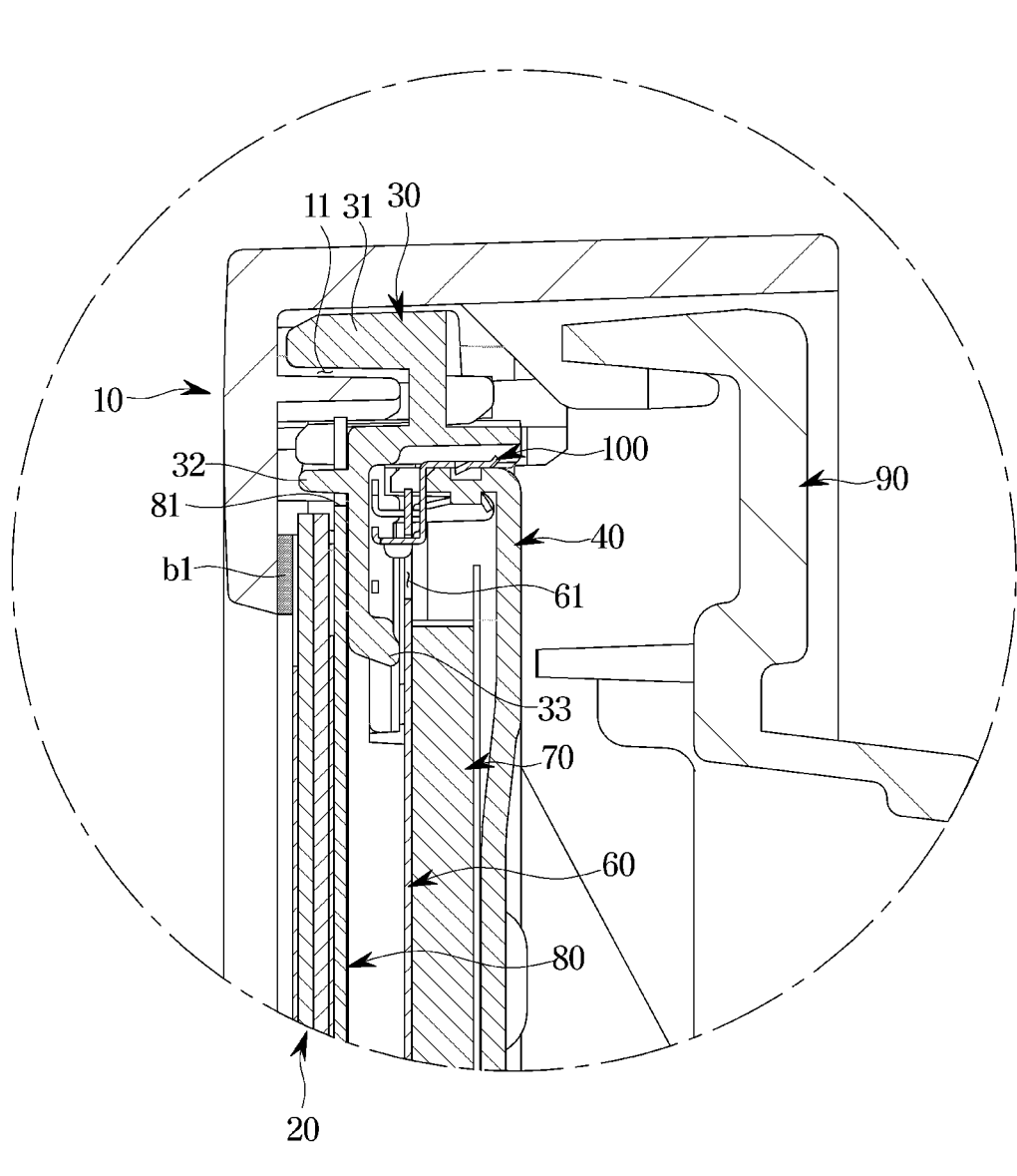
FIG. 4 is a cross-sectional view along A-A of FIG. 1.
Figure 5:
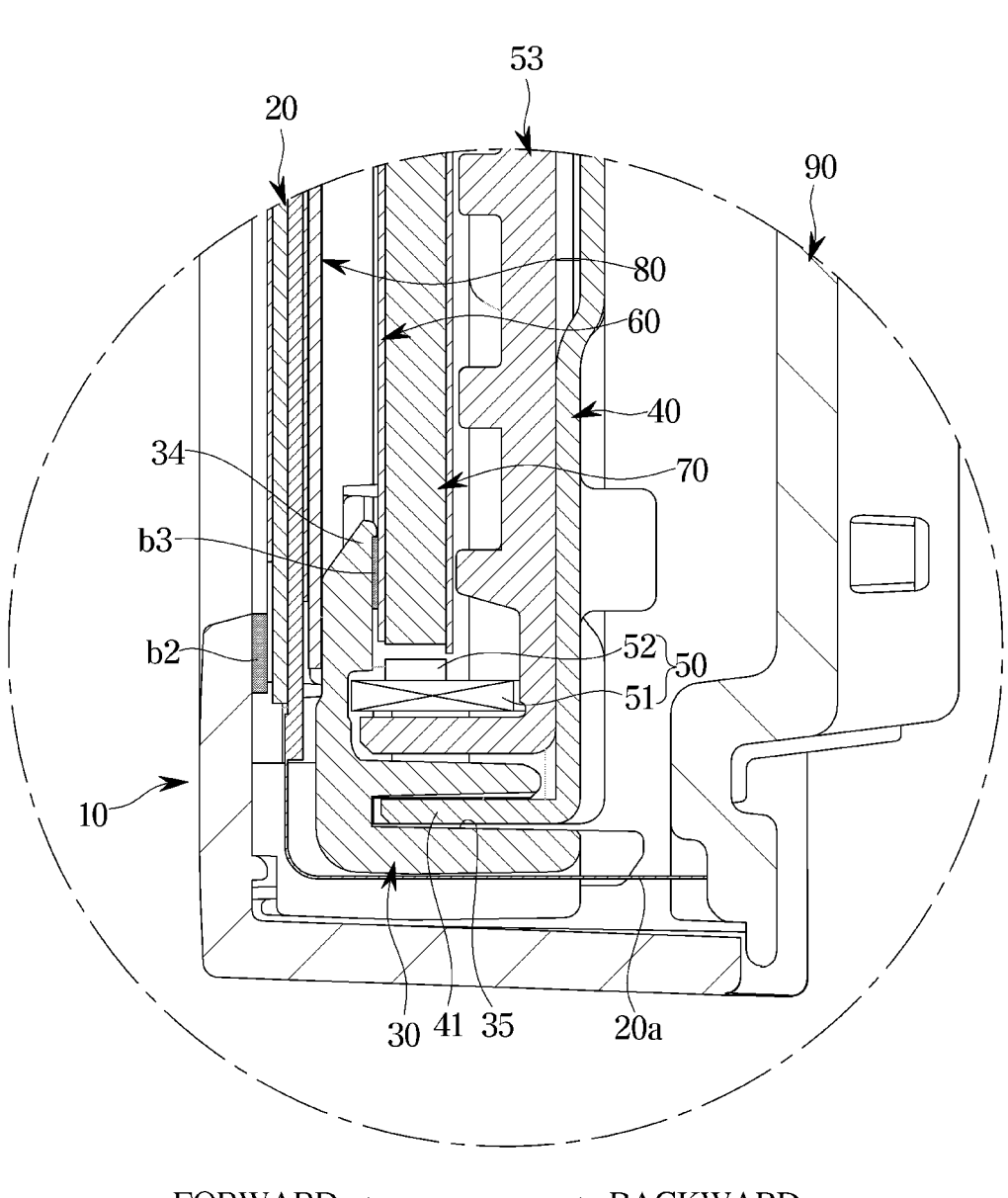
FIG. 5 is a cross-sectional view along B-B of FIG. 1.

FIG. 4 is a cross-sectional view along A-A of FIG. 1. FIG. 5 is a cross-sectional view along B-B of FIG. 1.

Referring to FIGS. 4 and 5, the top chassis 10 may be arranged to support the liquid crystal panel 20 by covering the front edge of the liquid crystal panel 20 and form the side exterior of the display apparatus 1. A portion of the top chassis 10 covering the front edge of the liquid crystal panel 20 may constitute a bezel of the display apparatus 1. The top chassis 10 may include a top chassis groove 11 formed for a first frame projection 31 of the middle frame 30 to be inserted thereto.

The middle frame 30 may include the first frame projection 31 arranged to be inserted to the top chassis groove 11 of the top chassis 10, a second frame projection 32 arranged to fix the light diffuser sheet 80 by passing through a sheet hole 81 of the optical diffuser sheet 80. Additionally, the middle frame 30 may include a third frame projection 33 and a fourth frame projections 34 provided to support the optical sheet 60. Furthermore, the middle frame 30 may include a frame groove 35 formed for a chassis projection 41 of the bottom chassis 40 to be inserted thereto. In an embodiment of the disclosure, the middle frame 30 may be injection-molded.

The bottom chassis 40 may be provided to cover the rear side of the liquid crystal panel 20. The bottom chassis 40 may include the chassis projection 41 formed with an ending portion of the bottom chassis 40 bent to be inserted to the frame groove 35 of the middle frame 30. The bottom chassis 40 may further include a bottom chassis groove 42 (see FIG. 8) formed for a fixer projection 102 of the sheet fixer 100 to be inserted thereto.

The liquid crystal panel 20 and the light diffuser sheet 80 arranged behind the liquid crystal panel 20 to cover the rear surface of the liquid crystal panel 20 may be arranged between the top chassis 10 and the middle frame 30. The light diffuser sheet 80 may be formed to diffuse light and may have a thickness thinner than the light guide panel 70.

Referring to FIGS. 4 and 5, a first buffering member b1 and a second buffering member b2 may be arranged between the liquid crystal panel 20 and the top chassis 10. The first buffering member b1 and the second buffering member b2 may be arranged between the liquid crystal panel 20 and the top chassis 10 to distribute pressure applied to the liquid crystal panel 20. The first buffering member b1 and the second buffering member b2 may be made of any material that is able to distribute the pressure.

The BLU 50 may emit light to a side of the light guide panel 70. The substrate 51 and the side of the light guide panel 70 may be arranged to face each other. Similarly, the LEDs 52 and the side of the light guide panel 70 may be arranged to face each other. Light emitted from the LEDs 52 may enter the light guide panel 70 through the side of the light guide panel 70, and the light that has entered the light guide panel 70 may exit through the front side of the light guide panel 70. Point light emitted from the plurality of LEDs 52 may pass through the light guide panel 70 to be changed to surface light.

In an embodiment of the disclosure, the BLU 50 may include a substrate frame 53 provided to fix the substrate 51. The substrate frame 53 may be arranged to be fixed to the bottom chassis 40 or the middle frame 30. As the substrate frame 53 is fixed to the bottom chassis 40 or the middle frame 30, the substrate 51 may be coupled to the inside of the display apparatus 1.

The optical sheet 60 may be arranged to cover the front side of the light guide panel 70. The optical sheet 60 may be arranged between the third and fourth frame projections 33 and 34 of the middle frame 30 and the light guide panel 70. The optical sheet 60 may be fixed by the sheet fixer 100. The optical sheet 60 may be provided to enhance properties of light output from the light guide panel 70.

Referring to FIG. 4, a gap may be formed in an upper portion of the display apparatus 1 between the optical sheet 60 and the third frame projection 33. The third frame projection 33 may be provided to prevent the optical sheet 60 from falling out forward. The third frame projection 33 may contact the optical sheet 60 such that the third frame projection does not apply pressure on the optical sheet 60. With this structure, when the optical sheet 60 expands, the third frame projection 33 may not hinder expansion of the optical sheet 60. The optical sheet 60 may expand upward.

Referring to FIG. 5, in a lower portion of the display apparatus 1, a third buffering member b3 may be arranged between the fourth frame projection 34 and the optical sheet 60.

The third buffering member b3 may apply pressure onto the optical sheet 60. Specifically, in a lower portion of the display apparatus 1, the optical sheet 60 may be coupled to the inside of the main body Ta by being pressed by the third buffering member b3 and the light guide panel 70. In the lower portion of the display apparatus 1, pressure may be constantly applied onto the optical sheet 60.

In the upper portion of the display apparatus 1, when the optical sheet 60 and the light guide panel 70 are not pressed by the third frame projection 33, a portion of the light emitted from the LEDs 52 may not enter the light guide panel 70. That is, the light may leak out of the light guide panel 70. To prevent this, the optical sheet 60 and the light guide panel 70 may be pressed by the third buffering member b3 in the lower portion of the display apparatus 1 where the BLU 50 is arranged. As the optical sheet 60 and the light guide panel 70 are pressed by the third buffering member b3 in a lower portion of the display apparatus 1, leakage of light emitted from the LEDs 52 may be prevented.

The middle frame 30 may include the fourth frame projection 34 that serves as a positioning guide to which the third buffering member b3 may be attached. The third buffering member b3 may be made of any material that is able to distribute the pressure.

When the display apparatus 1 is in the horizontal position, even though a lower portion of the optical sheet 60 is pressed by the third buffering member b3, when the optical sheet 60 vertically expands, the optical sheet 60 may expand downward because the downward gravitational force on the optical sheet 60 is greater than a frictional force on the optical sheet 60 caused by being pressed by the third buffering member b3. When the display apparatus 1 is in a vertical position (i.e., rotated clockwise or counterclockwise by 90° or 270° with respect to the horizontal position), the up-down direction is turned to the left-right direction, therefore the downward gravitational force on the optical sheet 60 does not act in the same direction (with respect to the horizontal position) on the portion pressed by the third buffering member b3. In the vertical position, an ending portion of one side of the optical sheet 60 is constrained by the third buffering member b3, so that the optical sheet 60 may expand toward an ending portion of the other side of the optical sheet 60. In a case that the ending portion of the other side of the optical sheet 60 is constrained without a gap between a hole 61 and an anti-deviation projection 110 arranged in the ending portion of the other side of the optical sheet 60, the optical sheet 60 may crease when the optical sheet 60 expands. This may cause distortion of the image I.

According to the disclosure, the third frame projection 33 may not constrain an upper end of the optical sheet 60. This may allow the optical sheet 60 to expand upward. Although not shown, the third frame projection 33 may be provided to prevent the side ends of the optical sheet 60 from being deviated. Specifically, the third frame projection 33 may prevent the side ends of the optical sheet 60 from falling out forward but may not constrain the side ends of the optical sheet 60 (similar to the upper end of the optical sheet 60). Accordingly, the optical sheet 60 may also expand toward one or both sides. In an embodiment of the disclosure, the optical sheet 60 may expand upward and toward the left and right sides. This may prevent the optical sheet 60 from creasing when the optical sheet 60 expands. Furthermore, this may prevent the optical sheet 60 from creasing even if the display apparatus 1 is rotated.

Figure 6:
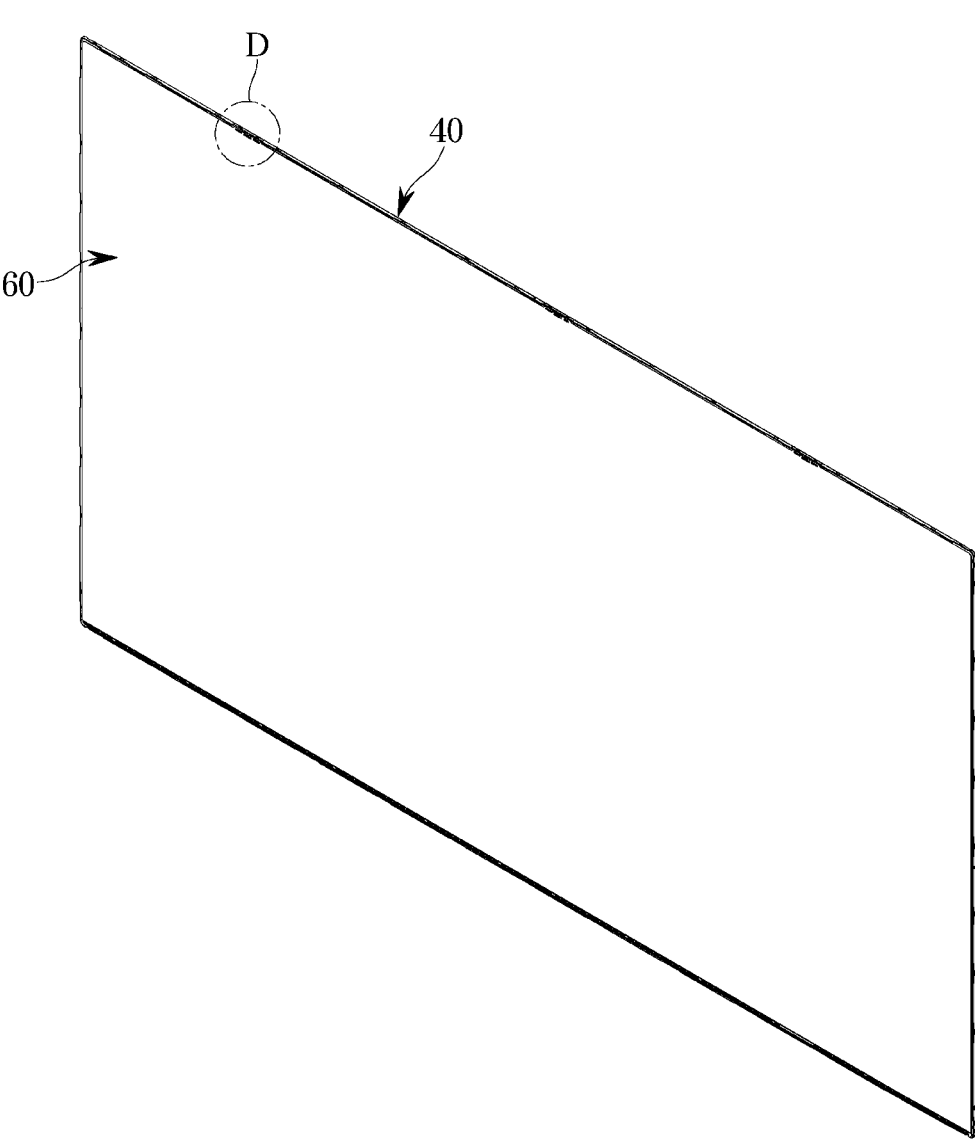
FIG. 6 separately illustrates an optical sheet, a sheet fixer, and a bottom chassis in a display apparatus, according to an embodiment of the disclosure.
Figure 7:
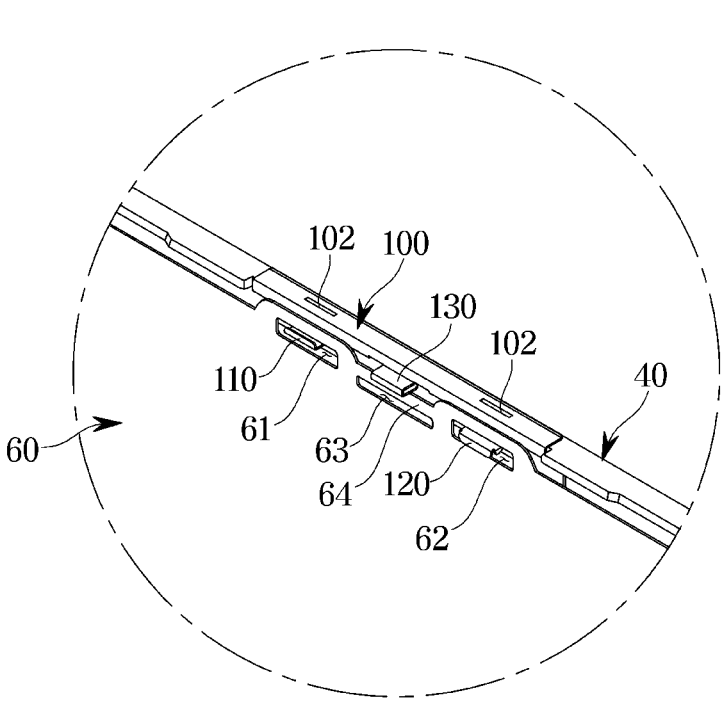
FIG. 7 is an enlarged view of portion D of FIG. 6.
Figure 8:
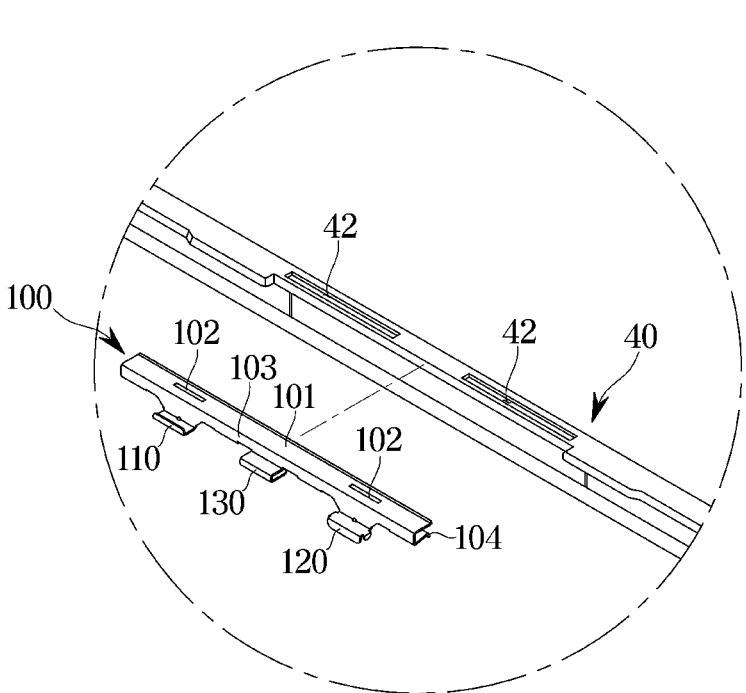
FIG. 8 illustrates a sheet fixer separated from a bottom chassis, according to an embodiment of the disclosure.
Figure 9:
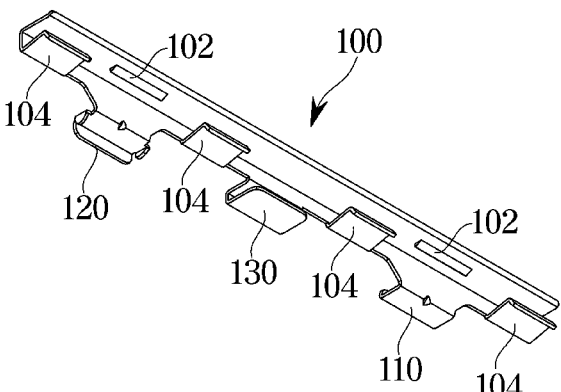
FIG. 9 illustrates a sheet fixer viewed from a different angle, according to an embodiment of the disclosure.

FIG. 6 separately illustrates an optical sheet, a sheet fixer, and a bottom chassis in a display apparatus, according to an embodiment of the disclosure. FIG. 7 is an enlarged view of portion D of FIG. 6. FIG. 8 illustrates a sheet fixer separated from a bottom chassis, according to an embodiment of the disclosure. FIG. 9 illustrates a sheet fixer viewed from a different angle, according to an embodiment of the disclosure.

Referring to FIGS. 6, 7, 8 and 9, in the display apparatus 1 according to an embodiment of the disclosure, the optical sheet 60 may be fixed by the sheet fixer 100. The sheet fixer 100 may be elastically fitted to the bottom chassis 40 without an extra fastening member. The sheet fixer 100 may be provided in the plural to be arranged at certain intervals along an upper edge of the bottom chassis 40. For example, there may be three sheet fixers 100. It is not, however, limited thereto, and the number of sheet fixers may be changed depending on the size of the optical sheet 60.

The optical sheet 60 may include the hole 61, a guide hole 62, and a deformable hole 63 arranged side by side. The hole 61, the deformable hole 63 and the guide hole 62 may also be referred to as first, second, and third holes.

The optical sheet 60 may include a deformable part 64 arranged above the deformable hole 63. The deformable part 64 and the deformable hole 63 may be arranged between the hole 61 and the guide hole 62.

The sheet fixer 100 may include the fixer projection 102 arranged to be inserted to the bottom chassis groove 42 of the bottom chassis 40, and an elastic projection 104 formed to be elastically coupled to the bottom chassis 40. The fixer projection 102 and the elastic projection 104 may each be provided in the plural. The elastic projection 104 may be formed to be deformable. The sheet fixer 100 may be coupled to the bottom chassis 40 by elastic resilience of the elastic projection 104.

The sheet fixer 100 may include a first body 101 arranged to face the upper surface of the bottom chassis 40, and a second body 103 extending downward from the first body 101. The fixer projection 102 may be formed with a portion of the first body 101 sunken downward, and the elastic projection 104 may be formed by extending backward from the second body 103.

The sheet fixer 100 may include the anti-deviation projection 110, a supporting projection 130, and a guide projection 120. The anti-deviation projection 110, the supporting projection 130, and the guide projection 120 may also be referred to as first, second, and third projections.

The anti-deviation projection 110 may be inserted to the hole 61 and the guide projection 120 may be inserted to the guide hole 62 to restrict downward movement of the optical sheet 60. The supporting projection 130 may restrict upward movement of the optical sheet 60 by contacting the deformable part 64.

Figure 10:
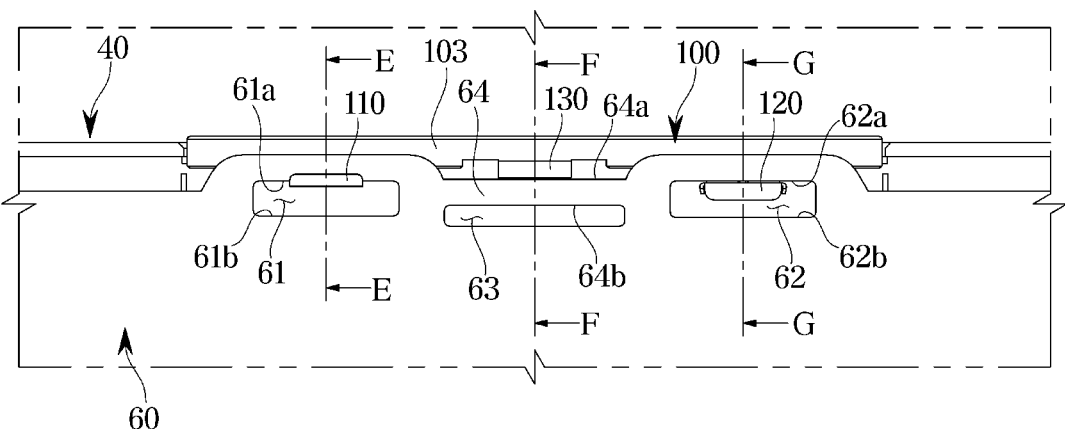
FIG. 10 is a front view of FIG. 7.
Figure 11:
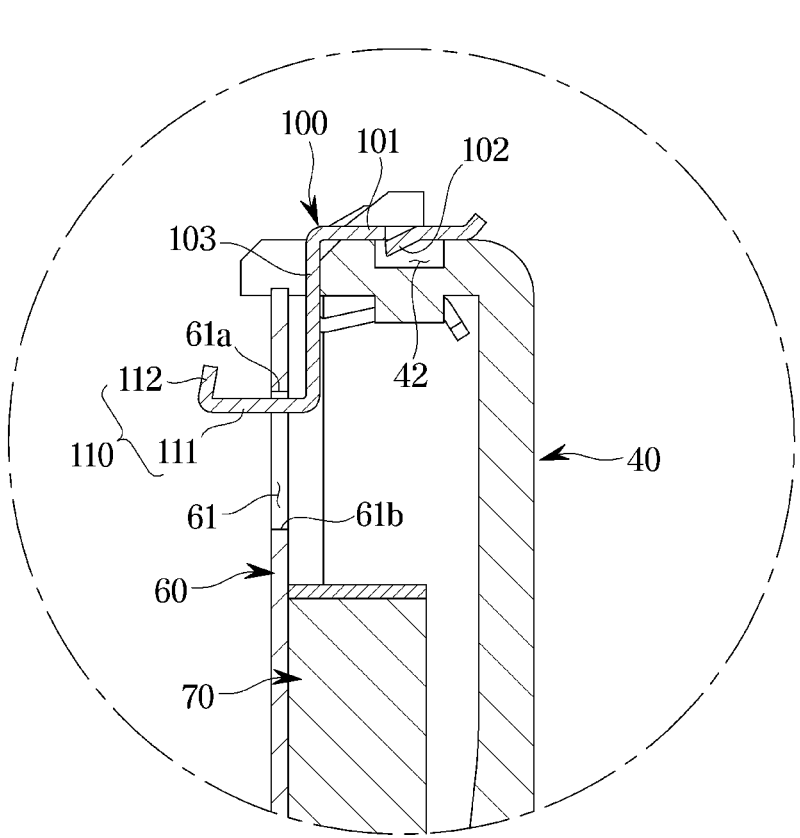
FIG. 11 is a cross-sectional view along E-E of FIG. 10.
Figure 12:
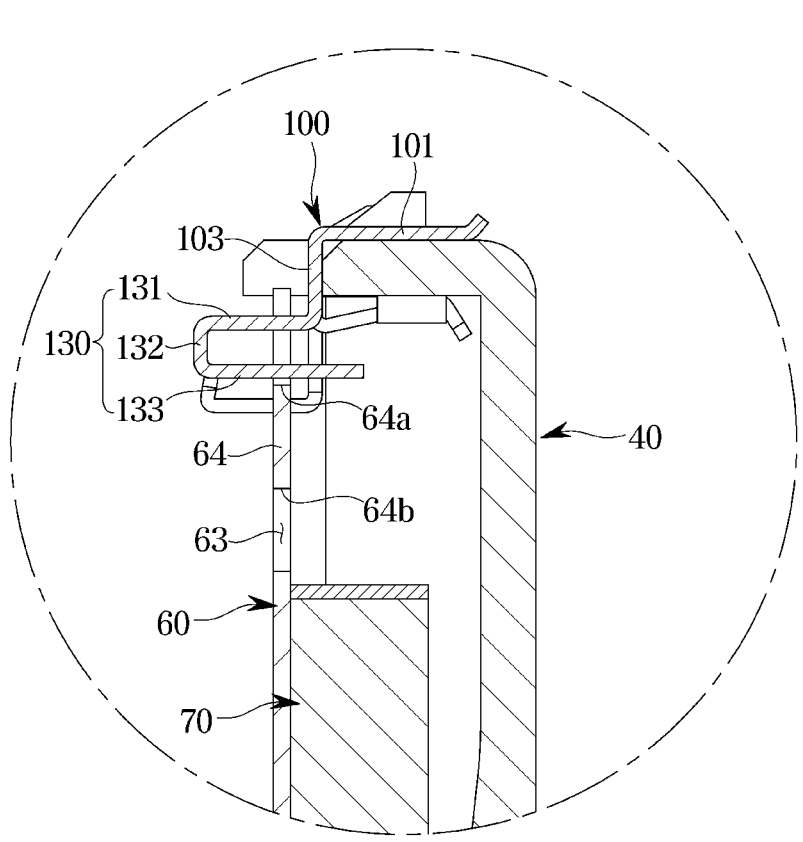
FIG. 12 is a cross-sectional view along F-F of FIG. 10.
Figure 13:
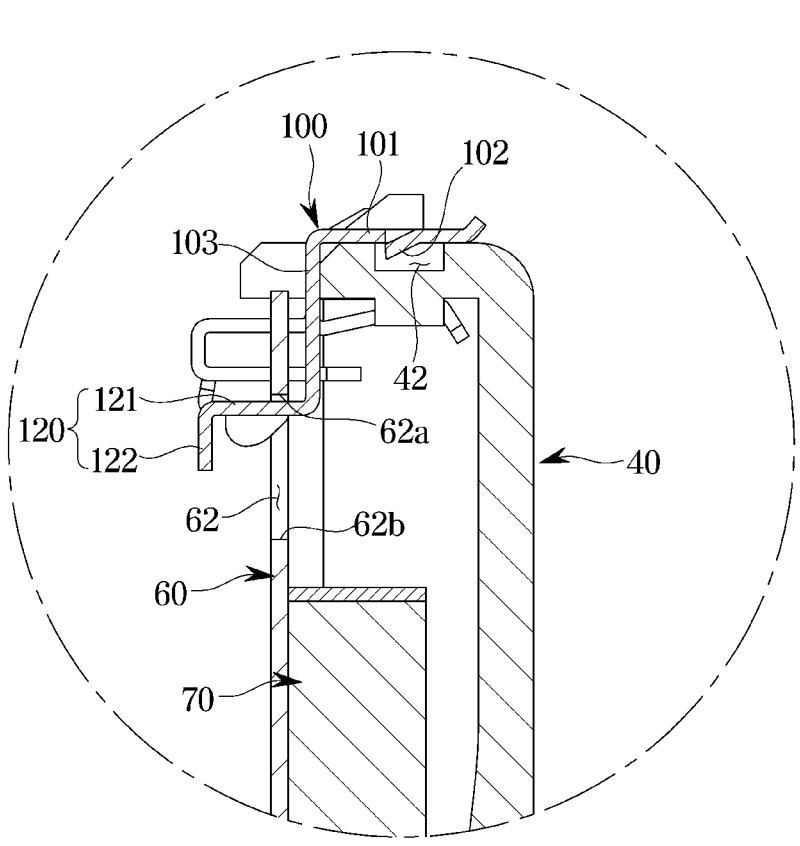
FIG. 13 is a cross-sectional view along G-G of FIG. 10.

FIG. 10 is a front view of FIG. 7. FIG. 11 is a cross-sectional view along E-E of FIG. 10. FIG. 12 is a cross-sectional view along F-F of FIG. 10. FIG. 13 is a cross-sectional view along G-G of FIG. 10.

Referring to FIGS. 10, 11, 12, and 13, structures of the optical sheet 60 and the sheet fixer 100 when the optical sheet 60 is not expanded will now be described in detail.

Referring to FIGS. 10 and 11, the anti-deviation projection 110 may include a first projection 111 protruding forward from the second body 103, and an anti-deviation part 112 bent upward from the first projection 111.

When the anti-deviation projection 110 is inserted to the hole 61, the first projection 111 may come into contact with an upper end 61a of the hole 61. As the optical sheet 60 moves downward by gravity, the first projection 111 comes into contact with the upper end 61a of the hole 61 to restrict downward movement of the optical sheet 60.

The anti-deviation part 112 may be provided to prevent the anti-deviation projection 110 from passing through the hole 61 as the optical sheet 60 moves forward or backward. In other words, the anti-deviation part 112 may be arranged to remain inserted through the hole 61 even when the optical sheet 60 moves forward or backward. As shown in FIGS. 4 and 5, the edges of the optical sheet 60 may be prevented from falling out forward by the third frame projection 33 or the fourth frame projection 34. The anti-deviation part 112 may be arranged to prevent the optical sheet 60 from falling out of the sheet fixer 100 before the display apparatus 1 is assembled.

In an embodiment, the anti-deviation part 112 may be bent upward from an end of the first projection 111. As described above, the optical sheet 60 may move downward due to gravity until the first projection 111 and the upper end 61a of the hole 61 come into contact with each other. When the optical sheet 60 moves forward while the first projection 111 is in contact with the upper end 61a of the hole 61, the anti-deviation part 112 and the optical sheet 60 come into contact with each other, thereby preventing deviation of the optical sheet 60.

A gap may be formed in the vertical direction between the anti-deviation projection 110 and a lower end 61b of the hole 61. Specifically, a gap may be formed in the vertical direction between the first projection 111 and the lower end 61b of the hole 61. With the gap formed in the vertical direction between the anti-deviation projection 110 and the hole 61, the anti-deviation projection 110 may not hinder expansion of the optical sheet 60.

Referring to FIGS. 10 and 12, the supporting projection 130 may be arranged to come into contact with the deformable part 64 of the optical sheet 60. The deformable part 64 may form a portion of the edges of the optical sheet 60. The deformable part 64 may be formed to be structurally deformed by the supporting projection 130 when the optical sheet 60 expands. For example, the deformable part 64 may be bent when the optical sheet 60 expands.

The supporting projection 130 may include a third projection 131 protruding forward from the second body 103, a first extension 132 extending downward from the third projection 131, and a second extension 133 extending backward from the first extension 132. With this double bending structure of the supporting projection 130, there may be no pointed projection formed from the front of the sheet fixer 100. Accordingly, the assembly worker may protect his/her hands from being wounded by a possible end protruding from the supporting projection 130.

In an embodiment of the disclosure, the deformable hole 63 may be formed below the deformable part 64 of the optical sheet 60. The deformable hole 63 may be provided to supplement structural deformation of the deformable part 64. As the deformable hole 63 is deformed in shape, structural deformation or bending of the deformable part 64 may be easily made. The deformable hole 63 may facilitate not only deformation of the deformable part 64 but also restoration of the deformable part 64. For example, the deformable hole 63 may facilitate a spring-like action of the deformable part 64. That is, when the optical sheet 60 expands in an upward direction (e.g., due to heat generated by the BLU 50), potential energy is stored in the compression/deformation of the deformation part 64 into the space provided by the deformable hole 63; and when the optical sheet 60 contracts (e.g., due to cooling when the BLU 50 is switched off), the potential energy of the deformation part 64 is released causing the optical sheet 60 to contract in a downward direction and restoring the deformable part 64.

The deformable part 64 may be arranged between the hole 61 and the guide hole 62. The deformable part 64 may connect a surrounding portion of the hole 61 to a surrounding portion of the guide hole 62. The deformable part 64 may also be referred to as a bridge.

Referring to FIGS. 10 to 13, the guide projection 120 may be arranged to be inserted to the guide hole 62. The guide projection 120 may be inserted to the guide hole 62 to guide the assembling position of the optical sheet 60. Even when the guide projection 120 is inserted to the guide hole 62, the guide projection 120 may be pulled out from the guide hole 62 when the optical sheet 60 or the sheet fixer 120 moves forward or backward.

The guide projection 120 may include a second projection 121 protruding forward from the second body 103, and a bending part 122 bent downward from the second projection 121.

Like the first projection 111, the second projection 121 may be arranged to come into contact with an upper end 62a of the guide hole 62. A gap may be formed between the second projection 121 and a lower end 62b of the guide hole 62. Due to the gap between the second projection 121 and the guide hole 62, expansion of the optical sheet 60 may not be hindered by the guide projection 120.

In an embodiment of the disclosure, the bending part 122 may prevent the guide projection 120 from passing through the guide hole 62 due to forward movement of the optical sheet 60 when the optical sheet 60 expands. Furthermore, the bending part 122 may prevent the assembly worker from being wounded on his/her hand by a possible end protruding forward from the second projection 121.

Figure 14:
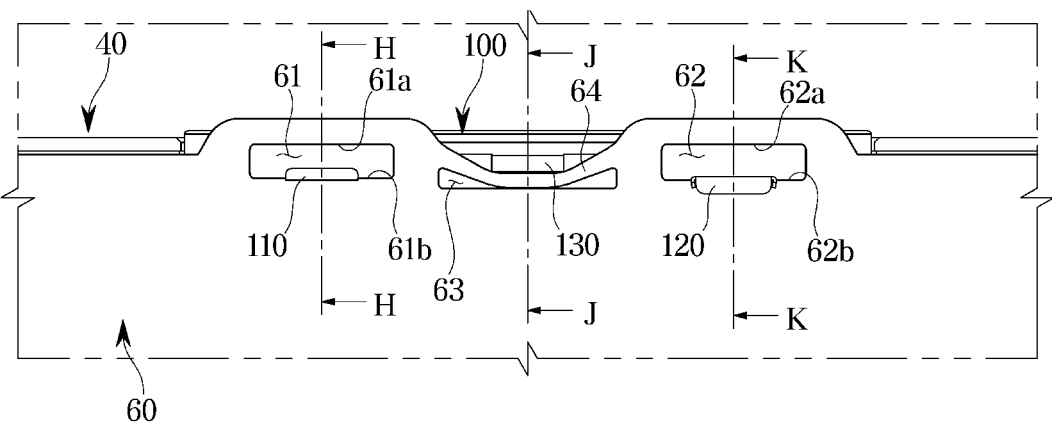
FIG. 14 illustrates an optical sheet, a sheet fixer, and a bottom chassis in a display apparatus when the optical sheet expands, according to an embodiment of the disclosure.
Figure 15:
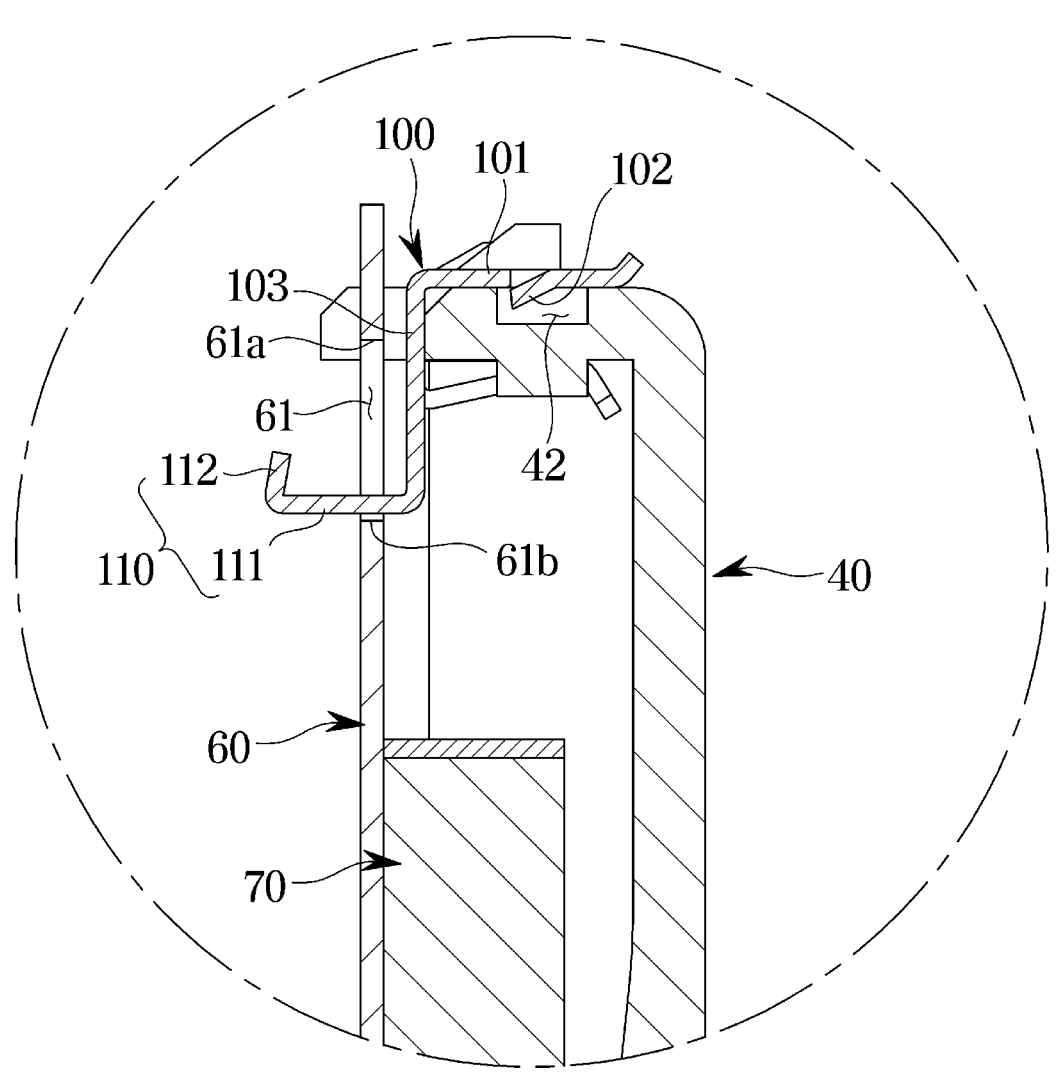
FIG. 15 is a cross-sectional view along H-H of FIG. 14.
Figure 16:
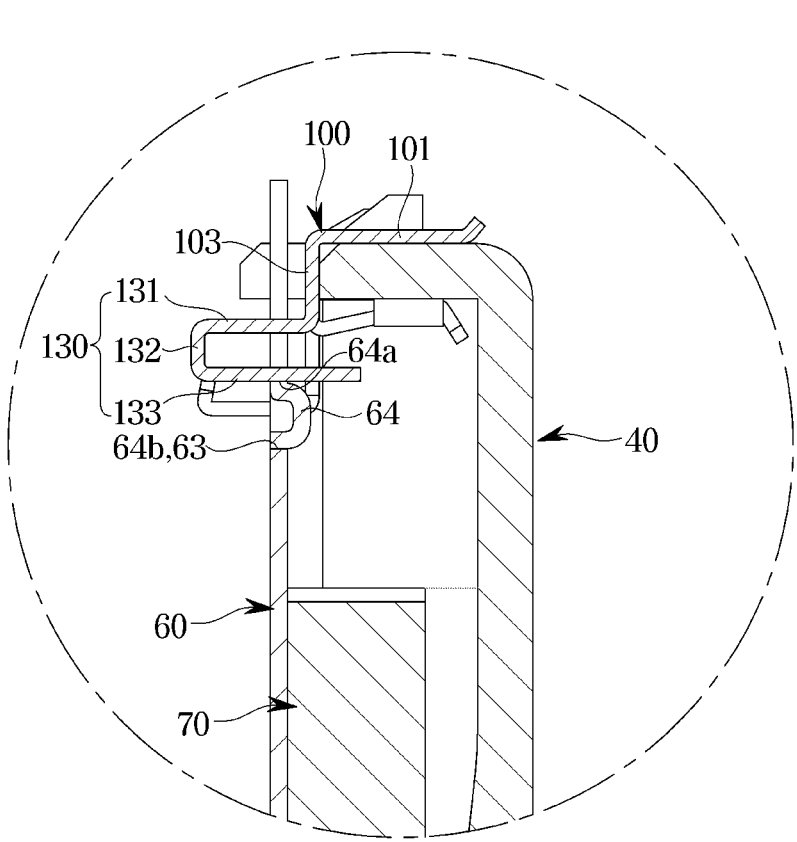
FIG. 16 is a cross-sectional view along J-J of FIG. 14.
Figure 17:
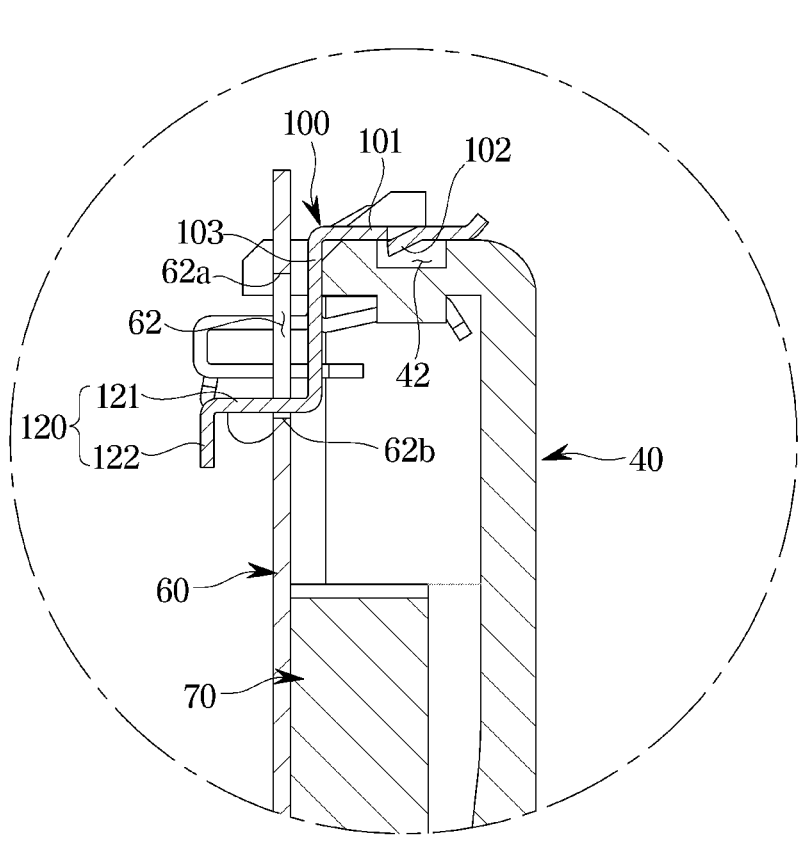
FIG. 17 is a cross-sectional view along K-K of FIG. 14.

FIG. 14 illustrates an optical sheet, a sheet fixer, and a bottom chassis in a display apparatus when the optical sheet expands, according to an embodiment of the disclosure. FIG. 15 is a cross-sectional view along H-H of FIG. 14. FIG. 16 is a cross-sectional view along J-J of FIG. 14. FIG. 17 is a cross-sectional view along K-K of FIG. 14.

Referring to FIGS. 14 to 17, structures of the optical sheet 60 and the sheet fixer 100 when the optical sheet 60 expands will now be described in detail.

Referring to FIG. 14, the optical sheet 60 may expand due to heat generated when the display apparatus 1 operates. As described above, when the optical sheet 60 expands, the optical sheet 60 may expand upward because the lower end of the optical sheet 60 is fixed by being pressed by the fourth frame projection 34. Hence, the optical sheet 60 may appear to be slightly moved upward. However, for convenience of explanation, FIGS. 15 to 18 illustrate the optical sheet 60 assumed to have expanded, but actual features may be different from what are shown in FIGS. 15 to 18.

When the optical sheet 60 expands, the deformable part 64 and the deformable hole 63 may be deformed in structure by the supporting projection 130. For example, as shown in FIG. 17, the deformable part 64 may be bendable.

Furthermore, when the optical sheet 60 expands, the anti-deviation projection 110 may come into contact with the lower end 61*b* of the hole 61 and the guide projection 120 may come into contact with the lower end 62*b* of the guide hole 62.

Referring to FIG. 15, when the optical sheet 60 expands, the first projection 111 may come into contact with the lower end 61*b* of the hole 61. It is not, however, limited thereto, and the optical sheet 60 may expand less than necessary to contact the lower end 61*b* of the hole 61.

Referring to FIG. 16, when the optical sheet 60 expands, the deformable part 64 may be bent by the supporting projection 130. This may cause a lower end 64*b* of the deformable part 64 to come into contact with the deformable hole 63. It is not, however, limited thereto, and the lower end 64*b* of the deformable part 64 may expand less than necessary to contact the deformable hole 63.

Referring to FIG. 17, when the optical sheet 60 expands, the second projection 121 may come into contact with the lower end 62*b* of the guide hole 62. It is not, however, limited thereto, and the optical sheet 60 may expand less than necessary to contact the lower end 62*b* of the guide hole 62.

Figure 18:
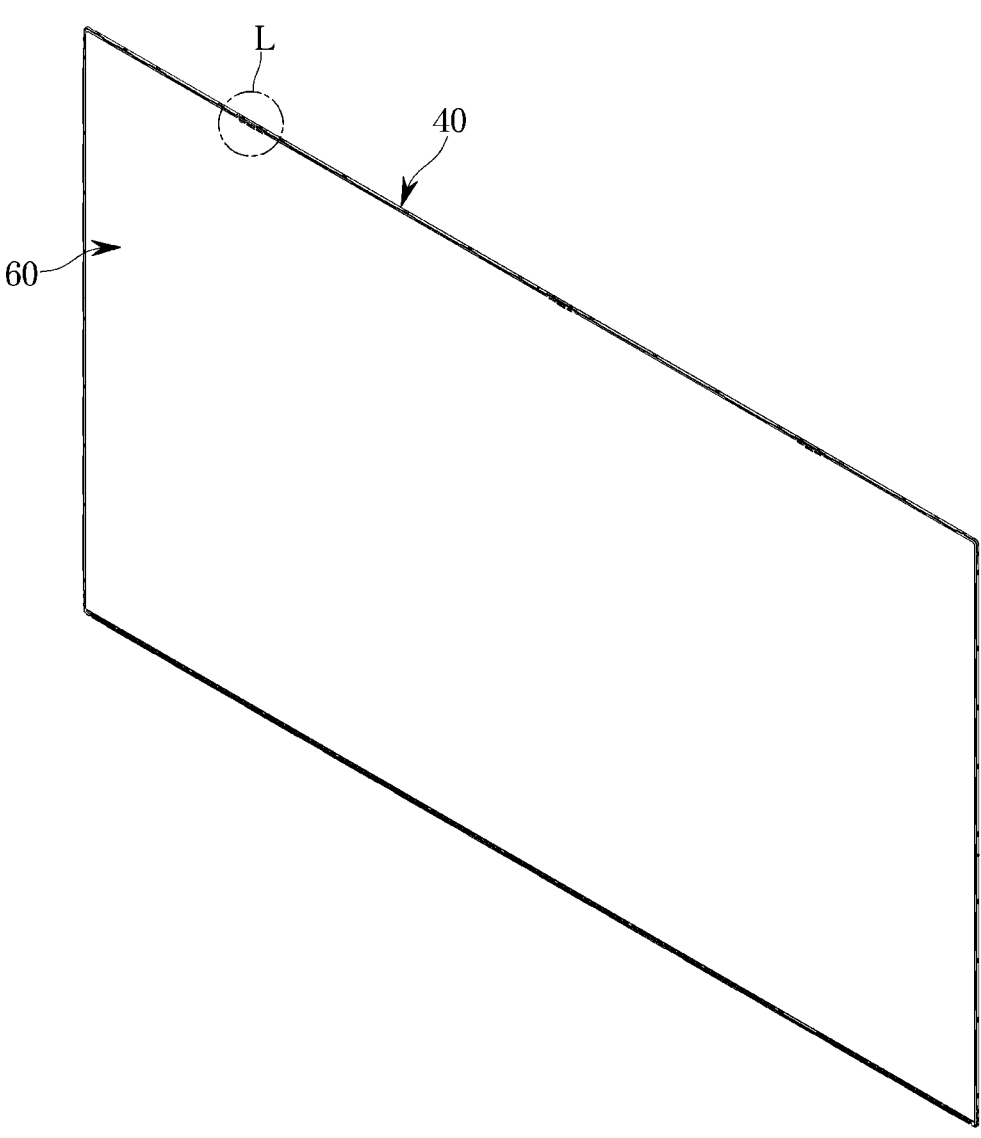
FIG. 18 separately illustrates an optical sheet, a sheet fixer, and a bottom chassis in a display apparatus, according to an embodiment of the disclosure.
Figure 19:
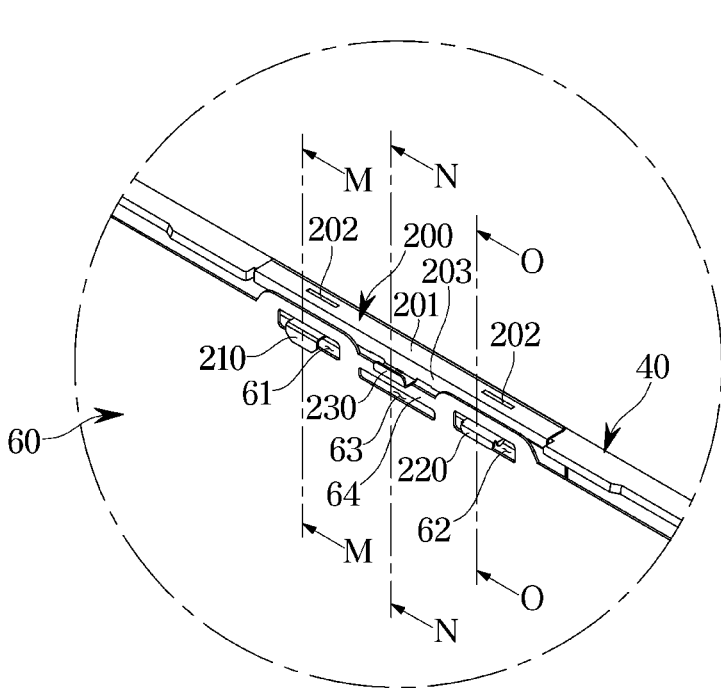
FIG. 19 is an enlarged view of portion L of FIG. 18.
Figure 20:
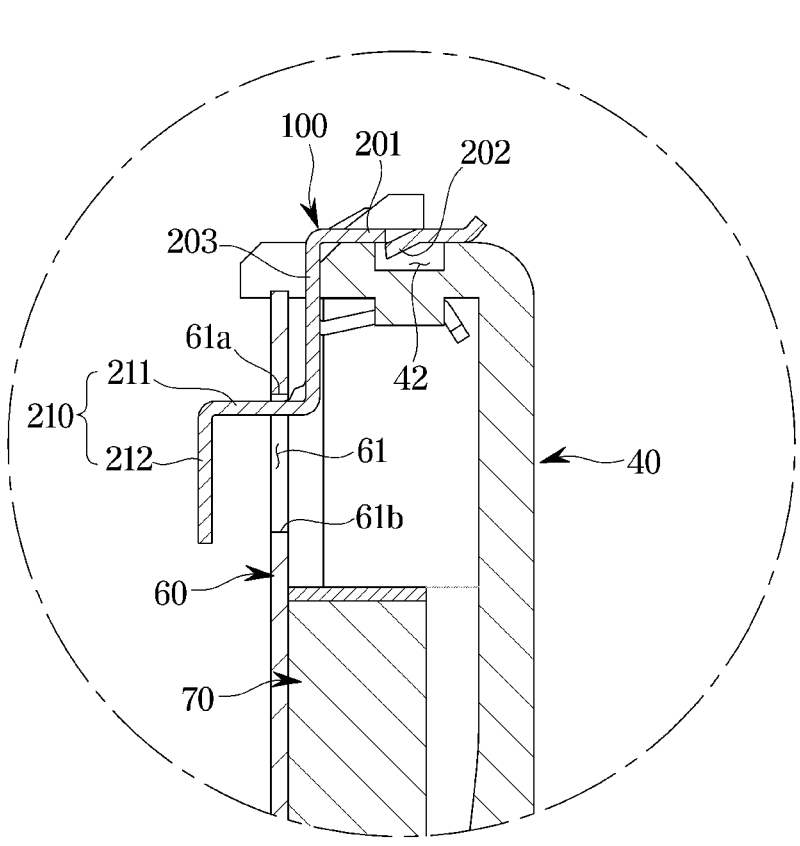
FIG. 20 is a cross-sectional view along M-M of FIG. 19.
Figure 21:
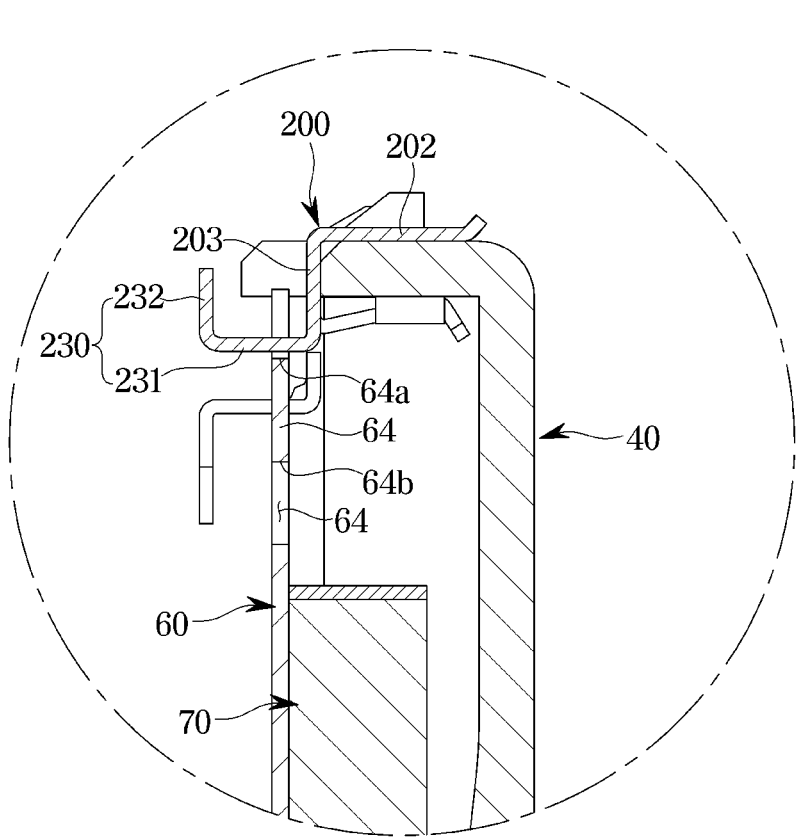
FIG. 21 is a cross-sectional view along N-N of FIG. 19.
Figure 22:
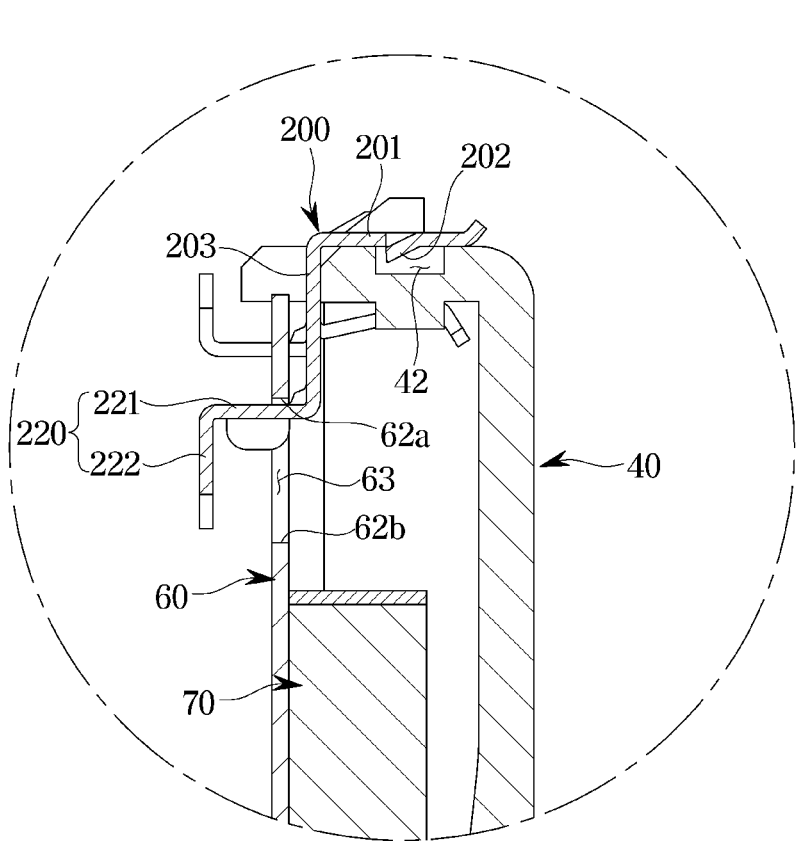
FIG. 22 is a cross-sectional view along O-O of FIG. 19.

FIG. 18 separately illustrates an optical sheet, a sheet fixer, and a bottom chassis in a display apparatus, according to an embodiment of the disclosure. FIG. 19 is an enlarged view of portion L of FIG. 18. FIG. 20 is a cross-sectional view along M-M of FIG. 19. FIG. 21 is a cross-sectional view along N-N of FIG. 19. FIG. 22 is a cross-sectional view along O-O of FIG. 19.

Referring to FIGS. 18 to 22, a sheet fixer 200 in accordance with an embodiment of the disclosure will now be described. The sheet fixer 200 may have the same function and purpose as the aforementioned sheet fixer 100 except for a partial structure. As the other structures are identical between the sheet fixer 200 and the aforementioned sheet fixer 100, overlapping descriptions thereof will not be repeated.

In an embodiment of the disclosure, the sheet fixer 200 may include a first body 201 arranged to face the upper surface of the bottom chassis 40, a fixer projection 202 formed with a portion of the first body 201 sunken, a second body 203 extending downward from the first body 201, and an elastic projection protruding backward from the second body 203.

Furthermore, the sheet fixer 200 may include an anti-deviation projection 210, a supporting projection 230, and a guide projection 220.

Referring to FIGS. 19 and 20, the sheet fixer 200 according to an embodiment of the disclosure may include the anti-deviation projection 210. The anti-deviation projection 210 may be inserted to the hole 61 to prevent the sheet fixer 200 from falling out of the hole 61. In other words, the anti-deviation projection 210 may be inserted to the hole 61 to prevent the optical sheet 60 from falling out of the sheet fixer 200.

In an embodiment of the disclosure, the anti-deviation projection 210 may include a first projection 211 protruding forward from the second body 203, and an anti-deviation part 212 extending downward from an end of the first projection 211.

The anti-deviation part 212 may be formed to have a vertical length larger than the vertical size of the hole 61. With this structure, when the anti-deviation part 212 is inserted to the hole 61, the optical sheet 60 may be prevented from being separated from the sheet fixer 200 because the anti-deviation part 212 is stuck in the hole 61 even when the optical sheet 60 or the sheet fixer 200 is moved forward or backward.

Referring to FIGS. 19 and 21, the supporting projection 230 may include a third projection 231 protruding forward from the second body 203, and an extension 232 extending upward from an end of the third projection 231. The extension 232 may prevent the assembly worker from being wounded on his/her hand by a possible end protruding forward from the third projection 231.

Referring to FIGS. 19 and 22, the guide projection 220 may include a second projection 221 protruding forward from the second body 203, and a bending part 222 extending downward from an end of the second projection 221. The bending part 222 may prevent the assembly worker from being wounded on his/her hand by a possible end protruding forward from the second projection 221.

According to the disclosure, a display apparatus having a structure of fixing an optical sheet to allow the optical sheet to expand uniformly even when a display is rotated may be provided.

While some embodiments of the disclosure have been described above, it will be understood that various modifications can be made without departing from the scope of the disclosure.

What is claimed is:

1. A display apparatus comprising:
 a liquid crystal panel;
 a chassis configured to cover a rear side of the liquid crystal panel;
 a backlight unit arranged to supply light to the liquid crystal panel;
 an optical sheet provided between the liquid crystal panel and the backlight unit and having a hole, a deformable part, and a deformable hole which is adjacent to the deformable part in a first direction toward a center of the optical sheet, the deformable hole being configured to assist structural deformation of the deformable part; and
 a sheet fixer configured to fix the optical sheet,
 wherein the sheet fixer comprises:

an anti-deviation projection inserted in the hole of the optical sheet to restrict movement of the optical sheet in the first direction, and a supporting projection provided outside the deformable hole, and contacting the deformable part to restrict movement of the optical sheet in a second direction in which the optical sheet expands toward an edge of the chassis due to heat by the backlight unit, wherein the hole and the deformable hole are arranged to be spaced apart from each other in a direction different from the first direction and the second direction along an edge of the optical sheet, and wherein the anti-deviation projection and the supporting projection are arranged to be spaced apart from each other in the direction in which the hole and the deformable hole are arranged.

2. The display apparatus of claim 1, wherein the deformable part is structurally deformed by the supporting projection due to expansion of the optical sheet.

3. The display apparatus of claim 2, wherein the optical sheet expands in the second direction by structural deformation of the deformable part.

4. The display apparatus of claim 1, wherein the anti-deviation projection contacts a first end of the hole, and wherein the anti-deviation projection is spaced apart from a second end of the hole by a gap in the second direction to allow expansion of the optical sheet in the second direction.

5. The display apparatus of claim 1, wherein the anti-deviation projection is configured to remain inserted through the hole when the anti-deviation projection moves forward or backward.

6. The display apparatus of claim 5, wherein the anti-deviation projection comprises:

a first projection extending through the hole, and an anti-deviation part extending from an end of the first projection in the second direction.

7. The display apparatus of claim 5, wherein the anti-deviation projection comprises:

a first projection extending through the hole, and an anti-deviation part extending from an end of the first projection in the first direction, and wherein the anti-deviation part has a length in the first direction that is longer than a width of the hole in the first direction.

8. The display apparatus of claim 2, wherein the optical sheet has a guide hole formed therein, and the guide hole is spaced apart from the hole, and wherein the sheet fixer further comprises a guide projection inserted to the guide hole and configured to guide the optical sheet during assembly of the optical sheet.

9. The display apparatus of claim 8, wherein the guide projection contacts a first end of the guide hole, and wherein the guide projection is spaced apart from a second end of the guide hole by a gap in the second direction to allow expansion of the optical sheet in the second direction.

10. The display apparatus of claim 8, wherein the supporting projection is provided between the anti-deviation projection and the guide projection, spaced apart from the anti-deviation projection in the second direction, and spaced apart from the guide projection in the second direction.

11. The display apparatus of claim 1, further comprising:

a bottom chassis covering a rear side of the liquid crystal panel, wherein the sheet fixer is coupled to the bottom chassis.

12. The display apparatus of claim 11, further comprising:

a middle frame provided along edges of the liquid crystal panel and configured to support the liquid crystal panel; and a light guide panel provided between the middle frame and the bottom chassis and configured to diffuse light emitted from the backlight unit, wherein a first edge of the optical sheet is fixed by being pressed by the middle frame and the light guide panel, and wherein one or more remaining edges of the optical sheet are spaced apart from the middle frame by a gap in a forward-backward direction.

13. The display apparatus of claim 12, wherein the backlight unit further comprises:

a substrate facing the first edge of the optical sheet pressed by the middle frame and the light guide panel, and a plurality of light sources arranged on the substrate at intervals in a direction in which the substrate extends.

14. The display apparatus of claim 11, wherein the sheet fixer is elastically fitted to the bottom chassis without an extra fastening member.

15. The display apparatus of claim 8, wherein the guide projection comprises:

a second projection extending forward to penetrate the guide hole, and a bending part bent downward from the second projection.

16. The display apparatus of claim 1, wherein the supporting projection comprises:

a third projection extending forward from a body of the sheet fixer, and a first extension extending downward from the third projection.

17. The display apparatus of claim 16, wherein the supporting projection further comprises:

a second extension extending backward from the first extension toward the body of the sheet fixer.

18. The display apparatus of claim 1, wherein the deformable hole is configured to assist structural restoration of the deformable part.

19. The display apparatus of claim 12, wherein the optical sheet expands in a direction away from the first edge of the optical sheet and toward the one or more remaining edges of the optical sheet when the optical sheet is in a vertical position, and wherein the optical sheet expands in a direction toward the first edge of the optical sheet when the optical sheet is in a horizontal position.

20. The display apparatus of claim 1, wherein the sheet fixer comprises:

a first body, and a second body extending downward from the first body, wherein the anti-deviation projection and the supporting projection are provided on the second body.

21. The display apparatus of claim 1, wherein the sheet fixer comprises a fixer projection configured to be inserted into a groove on the chassis.

22. The display apparatus of claim 1, wherein an entirety of the supporting projection is provided outside the deformable hole.

23. The display apparatus of claim 1, wherein the supporting projection protrudes from a surface of the sheet fixer facing a surface of the deformable part, and wherein the supporting projection contacts the deformable part outside the deformable hole.

* * * * *